(12) United States Patent
Wolf et al.

(10) Patent No.: US 8,718,333 B2
(45) Date of Patent: May 6, 2014

(54) SYSTEM, METHOD AND A COMPUTER READABLE MEDIUM FOR PROVIDING AN OUTPUT IMAGE

(75) Inventors: Lior Wolf, Herzliya (IL); Moshe Guttman, Tel Aviv (IL); Daniel Cohen-Or, Hod Hasharon (IL)

(73) Assignee: Ramot at Tel Aviv University Ltd., Tel Aviv (IL)

( * ) Notice: Subject to any disclaimer, the term of this patent is extended or adjusted under 35 U.S.C. 154(b) by 643 days.

(21) Appl. No.: 12/597,036

(22) PCT Filed: Apr. 17, 2008

(86) PCT No.: PCT/IL2008/000528
§ 371 (c)(1),
(2), (4) Date: May 11, 2011

(87) PCT Pub. No.: WO2008/129542
PCT Pub. Date: Oct. 30, 2008

(65) Prior Publication Data
US 2011/0199536 A1 Aug. 18, 2011

Related U.S. Application Data

(60) Provisional application No. 60/913,301, filed on Apr. 23, 2007.

(51) Int. Cl.
*G06K 9/00* (2006.01)

(52) U.S. Cl.
USPC ........... 382/115; 382/107; 382/118; 382/278; 340/5.52

(58) Field of Classification Search
USPC ......... 382/115, 117, 278, 282, 118; 340/5.52, 340/5.53
See application file for complete search history.

(56) References Cited

U.S. PATENT DOCUMENTS

| | | | | |
|---|---|---|---|---|
| 6,919,892 B1* | 7/2005 | Cheiky et al. | ................. | 345/473 |
| 7,027,054 B1* | 4/2006 | Cheiky et al. | ................. | 345/473 |
| 7,280,696 B2* | 10/2007 | Zakrzewski et al. | .......... | 382/218 |
| 7,374,536 B1* | 5/2008 | Taylor | ........................... | 600/300 |
| 7,413,502 B2* | 8/2008 | Mandler et al. | ................... | 451/42 |
| 7,505,604 B2* | 3/2009 | Zakrzewski et al. | .......... | 382/100 |
| 7,614,742 B2* | 11/2009 | Mandler et al. | ............. | 351/159.8 |
| 7,767,792 B2* | 8/2010 | Johns et al. | ................. | 530/387.3 |
| 8,078,006 B1* | 12/2011 | Sandrew et al. | .............. | 382/284 |
| 8,385,684 B2* | 2/2013 | Sandrew et al. | .............. | 382/284 |

* cited by examiner

Primary Examiner — Yosef Kassa
(74) Attorney, Agent, or Firm — Reches Patents

(57) ABSTRACT

A method for providing an output image, the method includes: determining an importance value for each input pixels out of multiple input pixels of an input image; applying on each of the multiple input pixels a conversion process that is responsive to the importance value of the input pixel to provide multiple output pixels that form the output image; wherein the input image differs from the output image.

15 Claims, 19 Drawing Sheets

Determining a distance between output image representations of a pair of adjacent input pixels is responsive to an importance of at least one of pair of adjacent input pixels. The distance can range from one or more pixels to a portion of a pixel. 121

At least partially compensating for camera induced motion. 122

Applying an optimal mapping between the input image to the output image. 123

Solving a set of sparse linear equations. 124

Applying a conversion process that is responsive to at least one of the following constraints: each input pixel is mapped to an output pixel that is located at substantially a fixed distance from its left and right neighbors; each input pixel is mapped to an output pixel located to substantially a similar location to which upper and lower input pixels are mapped; an input pixel is mapped to an output pixel located substantially at a same location as an output pixel to which the same input pixel at a previous image was mapped; and size and shape of the output image. 125

Re-sizing. 126

Altering an aspect ratio. 127

  
Figure 12a  Figure 12b  Figure 12c
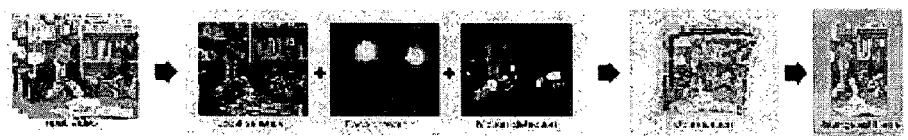
Figure 12d

Figure 13a                    Figure 13b
Figure 14a                    Figure 14b
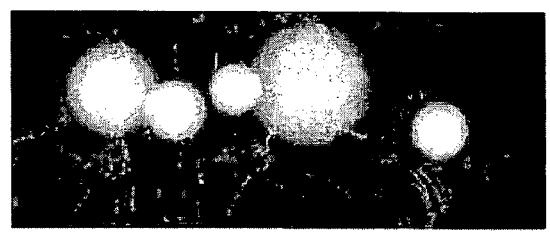
Figure 14c                    Figure 14d

SYSTEM, METHOD AND A COMPUTER READABLE MEDIUM FOR PROVIDING AN OUTPUT IMAGE

CROSS-REFERENCE TO RELATED APPLICATIONS

This application is a National Phase Application of PCT International Application No. PCT/IL2008/000528, entitled "SYSTEM, METHOD AND A COMPUTER READABLE MEDIUM FOR PROVIDING AN OUTPUT IMAGE", International Filing Date Apr. 17, 2008, published on Oct. 30, 2008 as International Publication No. WO 2008/129542, which in turn claims priority of U.S. Provisional Patent Application Ser. No. 60/913,301, filed Apr. 23, 2007, both of which are incorporated herein by reference in their entirety.

BACKGROUND OF THE INVENTION

With the recent advent of mobile video displays, and their expected proliferation, there is an acute need to display video on a smaller display than originally intended. Two main issues need to be confronted. The first is the need to change the aspect ratio of a video. The second is the need to downsample the video whilst maintaining enough resolution of objects-of-interest. An example of the first challenge is the display of wide screen movies on a 4:3 TV screen. Displaying a ball game on a cellular screen is a good example for the need of a smart down-sampling technique, where the ball needs to remain large enough to be easily seen on screen.

The current industry solutions are basic and not very effective. They include: blunt aspect ratio free resizing; cropping the middle of the video; resizing while preserving the aspect ratio by adding black stripes above and below the frame; and keeping the middle of the frame untouched while warping the sides. In fact, it is common nowadays to have printed lines on movie-cameras' screens that mark the region that will be visible in the frame after it would be cropped to the aspect ratio of a regular 4:3 TV screen.

There is a growing need to provide effective devices and method for image transformation.

SUMMARY OF THE INVENTION

A method for providing an output image, the method includes: determining an importance value for each input pixels out of multiple input pixels of an input image; applying on each of the multiple input pixels a conversion process that is responsive to the importance value of the input pixel to provide multiple output pixels that form the output image; wherein the input image differs from the output image.

A device for providing an output image, the device includes: a memory unit adapted to store an input image and a processor, adapted to: determine an importance value for each input pixels out of multiple input pixels of an input image and apply on each of the multiple input pixels a conversion process that is responsive to the importance value of the input pixel to provide multiple output pixels that form the output image; wherein the input image differs from the output image.

A computer readable medium that stores instructions for: determining an importance value for each input pixels out of multiple input pixels of an input image; and applying on each of the multiple input pixels a conversion process that is responsive to the importance value of the input pixel to provide multiple output pixels that form the output image; wherein the input image differs from the output image.

A method for providing an output image, the method includes: receiving an input frame and a feature mask defined by a rough selection of the features; applying a mapping process to provide the output image; wherein the mapping process differentiates between pixels of features included in the feature mask and between other pixels; wherein the applying comprises solving a sparse equation set.

A device for providing an output image, the device includes: a memory unit adapted to store an input image and a feature mask defined by a rough selection of the features; a processor, adapted to: apply a mapping process to provide the output image; wherein the mapping process differentiates between pixels of features included in the feature mask and between other pixels; wherein the applying comprises solving a sparse equation set.

A computer readable medium that stores instructions for: receiving an input frame and a feature mask defined by a rough selection of the features; applying a mapping process to provide the output image; wherein the mapping process differentiates between pixels of features included in the feature mask and between other pixels; wherein the applying comprises solving a sparse equation set.

BRIEF DESCRIPTION OF THE DRAWINGS

FIG. 4 illustrates a flow chart of a method according to an embodiment of the invention;

FIGS. 12a-12c, 13a-13b, 14a-14d, 15a-15e, 16a-16c, 17a-17c, 18a-18d, 19a-19b are input and output images; and FIG. 12d includes a series of images that illustrate various stages of a method according to an embodiment of the invention.

DETAILED DESCRIPTION OF THE DRAWINGS

Figure 1A:
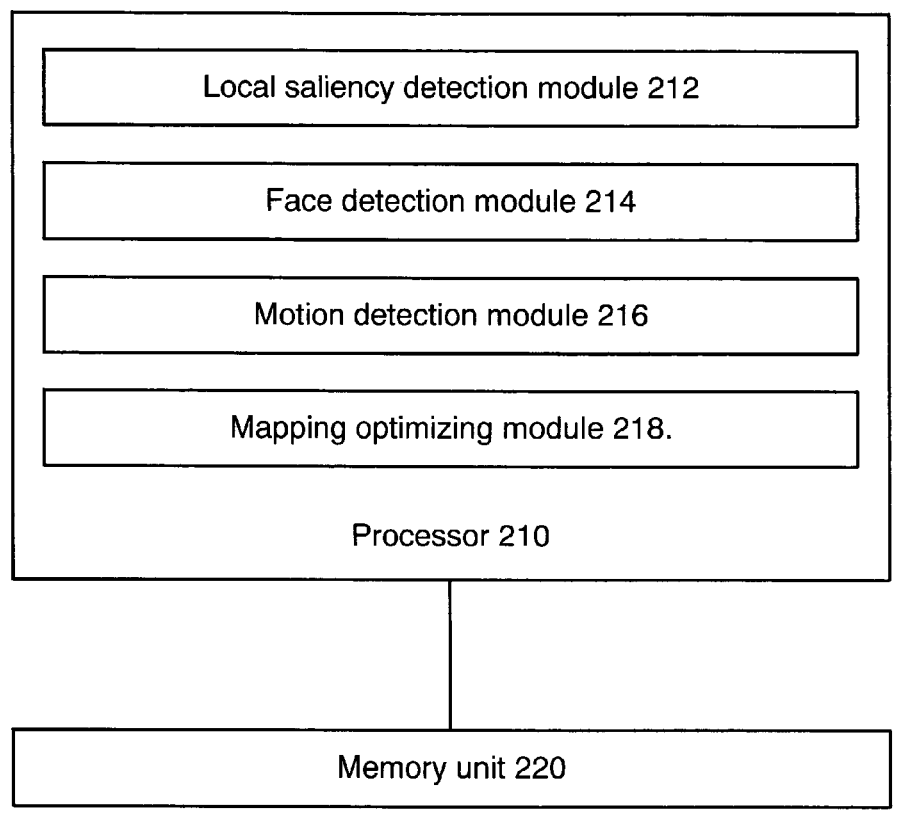
FIG. 1a illustrates a system according to an embodiment of the invention.

The terms "frame" and "image" have the same meaning. Each means a set or group of pixels. Multiple frames or images can form a shot, one or more shots can form a video stream.

Video retargeting is the process of transforming an existing video to fit the dimensions of an arbitrary display. A compelling retargeting aims at preserving the viewers' experience by maintaining the information content of important regions in the frame, whilst keeping their aspect ratio.

An efficient method for video retargeting is introduced. It includes two stages. First, the frame (input image) is analyzed to detect the importance of each region (or multiple input pixels) in the frame. Then, a transformation (conversion process) that respects the analysis shrinks less important regions more than important ones. The analysis is fully automatic and based on local saliency, motion detection, and object detectors. The performance of the proposed method is demonstrated on a variety of video sequences, and compared to the state of the art in image retargeting.

A method is provided. The method assigns a saliency score to each pixel in the video. An optimized transformation of the video to a downsized version is then calculated that respects the saliency score. The method is designed to work efficiently in an online manner, ultimately leading to a real-time retargeting of a streaming input video to several output formats. The saliency score is composed of three basic components: spatial gradient magnitude, a face detector (or another object of interest detector), and a block-based motion detector. The optimization stage amounts to solving a sparse linear system of equations. It considers spatial constraints as well as temporal ones, leading to a smooth temporal user experience. It is noted that the method can be applied in off-line, with the advantage of analyzing the entire shot.

Conveniently, a computer readable medium is provided. The computer readable medium can be a diskette, a compact disk, a disk, a tape, a memory chip and the like and it stores instructions for: determining an importance value for each input pixels out of multiple input pixels of an input image; and applying on each of the multiple input pixels a conversion process that is responsive to the importance value of the input pixel to provide multiple output pixels that form the output image; wherein the input image differs from the output image. The computer readable medium can store instructions for executing any stage of method 100.

Given a new frame, the method computes a per-pixel importance measure. This measure is a combination of three factors: a simple, gradient based, local saliency; an off-the-shelf face detector; and a high-end motion detector.

The optimization of the mapping function from the source resolution to the target resolution is set through a linear system of equations. Each pixel (i,j) at each frame t is associated with two variable $x_{i,j,t}$, $y_{i,j,t}$ that determine its location on the retargeted frame. The method optimizes for horizontal warps and for vertical warps separately, using the same technique. The horizontal post-warp location is first constrained to have the same coordinates as the warp of the pixel just below it $x_{i,j+1,t}$, and the pixel just before it $x_{i,j,t-1}$. Then it is constrained to have a distance of one from the warping of its left neighbor $x_{i-1,j,t}$.

For obvious reasons, it is impossible to satisfy all of the constraints and yet fit into smaller retargeting dimensions. To these space-preserving constraints, a weight was added in proportion to the pixel's importance value. A pixel with high importance is mapped to a distance of approximately one from its left neighbor, while a pixel of less saliency is mapped closer to its neighbor. Time smoothness is also taken into consideration, in order to generate a continuous natural-looking video.

The method is designed for video streaming. Therefore, time smoothness and motion analysis considerations are limited to the previous frames only. Such considerations need only apply to frames of the same shot (a sequence of video frames taken from a continuous viewpoint). It is noted that the method can be applied in off-line and thus can take into account multiple images of an input image sequence. It is noted that the method can be extended to an off-line method; thus, it can incorporate the advantages of off-line video analysis. This includes smooth time analysis that computes the mapping of each frame (image) based on an arbitrary number of frames before or after it, and better, more accurate motion-detector, shot-detector and object-detectors that can incorporate information from several frames at once.

The proposed method automatically breaks a long video into a sequence of shots using a simple online method, similar to the one shown in Meng, Y. Juan, and S.-F. Chang. Scene change detection in an MPEG-compressed video sequence; *Digital Video Compression: Algorithms and Technologies,* 1995 where the block matching operation is replaced with the efficient method of Lu and M. Liou. A simple and efficient search algorithm for block-matching motion estimation. *IEEE Trans. Circuits and Systems,* 1997. This combination is efficient, robust, and uninfluenced by object and camera motion. First, motion estimation is applied on each macroblock (16×16 pixels). A shot boundary is detected wherever the number of blocks for which the motion estimation fails exceeds a threshold. It is noted that the proposed method can be replaced with other "Shot detection" mechanisms, including off-line shot detection mechanisms.

Importance Determination

A content preservation weight matrix is defined:

$$S = \min\left(S_E + \sum_i S_F^i + S_{MD}, 1\right) \quad (1)$$

Each entry in the matrix represents the saliency of a single pixel in the source frame I. Values range between 0 and 1, where zero values are, content wise, non-important pixels. It is noted that other saliency factors can be added into this formula, for example, the output of more object detectors, or output of background regions. These factors need not only be combined using a linear function but also can be implemented using a more complex function such in the case of a probability computation.

Local Saliency

Various local saliency algorithms can be applied. For example, a simple measure for local information content in the frame such as the $L_2$-Norm of the gradient is applied:

$$S_E = \left(\left(\frac{\partial}{\partial x}I\right)^2 + \left(\frac{\partial}{\partial y}I\right)^2\right)^{1/2}.$$

It is noted that the local saliency function can be replaced with other energy function such as $L_1$-Norm or with the output of local saliency detectors.

Face Detection

According to an embodiment of the invention, the local saliency algorithm is based upon wavelet transformation. The wavelet breaks the frame into its "wavelets", scaled and shifted versions of a "mother wavelet." These scaled and shifted versions can be calculated by applying high pass filters and low pass filters. These scaled and shifted versions of the frame are associated with levels. Higher levels are referred to as coarser levels and include fewer details. Each level can include few (such as three) diagonal high frequency frame version (generated by applying a high pass filter on a previous level frame version in few directions such as, corollary horizontal, vertical and diagonal) and a low frequency frame version (generated by applying a low pass filter on a previous level frame version).

Conveniently, the local saliency algorithm includes: (i) wavelet decomposing a frame into multiple (N) levels; (ii) locating the coarsest diagonal high frequency frame in which the percentage of wavelet coefficients having values below a first threshold is below a second threshold; (iii) thresholding the coarsest diagonal high frequency frame (using the first threshold) to provide a binary frame (in which a bit can be set if the corresponding wavelet coefficient is above the threshold and can be reset of the corresponding wavelet coefficient is below the threshold); (iv) re-sizing the binary frame to the size of the input image; (v) smoothing the re-sized binary frame (for example by applying a Gaussian blur filter) to provide a saliency score per pixel of the input frame. It is noted that the high frequency diagonal frames can be HH frames (generated by a both horizontal and verticla high pass filters), that the locating stage can start from the N'th level and propagate upwards (to less coarse frames) till reaching the first diagonal high frequency frame that in which less then 50% of the wavelet coefficients have a value that is below the first threshold.

Human perception is highly sensitive to perspective changes in faces, more specifically to frontal portraits. In order to avoid deforming frontal portraits the Viola and Jones face detection mechanism was applied. (P. Viola and M. Jones. Robust real-time face detection. *International Journal Computer Vision*, 2004.)

The detector returns a list of detected faces. Each detected face i has a 2D center coordinate $F_p^i$ and a radius $F_r^i$. The face detection score of each pixel is a function of the distance of that pixel from the face's center: $D_i(x, y) = \|F_p^i - (x, y)\|_2$, and is given by the cubic function:

$$\hat{S}_F(x, y) = \max\left(1 - \frac{-D_i(x, y)^3 + .5 * D_i(x, y)^2}{-(F_r^i)^3 + .5 * (F_r^i)^2}, 0\right) \quad (2)$$

This function, which ranges between 0 and 1, is used to weight the importance of the face as an almost constant function with a drastic fall near the end of the face. This allows some flexibility at the edges of the face whilst avoiding face deformation. It is noted that the above function can be replaced with other weight function such as linear or square functions.

A rescaling measure can be provided. It has the following format:

$$F_m^i = \frac{F_r^i}{\max(C_{Width}, C_{Height})} \quad (3)$$

$$S_F^i(x, y) = \hat{S}_F^i(x, y)\left(1 - 2.5 * (F_m^i)^4 - 1.5 * (F_m^i)^2\right)$$

used to rescale the general saliency of a detected face in relation to the area it occupies in a $C_{Width} \times C_{Height}$ pixels frame. A 1 factor is used where the size of the face is relatively small, while extremely large faces tend to be ignored. The above prevents a distorted zooming effect, i.e. retargeting of the frame such that it is mostly occupied by the detected face. It is noted that the above rescaling function can be replaced with other rescaling function such as a constant function, linear and the like.

Since, as stated below, when shrinking the width of an image, smoothness over the columns is required, a detected face (detected by a face detector) also prevents thinning the regions below it. Therefore, human bodies are shrunk less, as necessitated. It is noted that a specific human figure detector can be added/replace the above face detector.

Retargeting examples of a frame (a) from the movie "300" with and without face detection. (b) the gradient map, with the faces detected imposed. (c) the result of retargeting to half the width without face detection. (d) the result of retargeting with face detection. The result of the whole shot compared to bi-cubic interpolation is available in the supplemental material.

Motion Detection

Moving objects in video draw most of the viewers' attention and are content-wise important. By using motion detection mechanism video can be retargeted while preserving the temporal context.

The second motion detector suggested in S.-C. Liu, C.-W. Fu, and S. Chang. Statistical change detection with moments under time-varying illumination. *IEEE Trans. on Image Processing*, 1998 is implemented. The selected method is efficient and effective, although little known.

Let the frame be partitioned into N×N (N=8) pixel square blocks and $A_{uv}$ denote the (u, v)th block. The image coordinate (x, y) is in $A_{uv}$ if $(u-1)N+1 \leq x \leq uN$ and $(v-1)N+1 \leq y \leq vN$. define $x' = (x)_{mod\,N}$ and $y' = (y)_{mod\,N}$.

For each block $A_{uv}$, the total intensity of the block at frame t is calculated:

$$A_t(u, v) := \sum_{x'=1}^{N} \sum_{y'=1}^{N} I_t(x, y).$$

Then, the normalized "circular shift moments" in the x and y directions $mx_t^j(u, v)$, $my_t^j(u, v)$ are computed for $j=0\ldots N-1$. The x moment is formulated: (respectively y)

$$mx_t^j(u, v) = A_t(u, v)^{-1} \sum_{x'=1}^{N} (x - j)_{mod\,N} \cdot \sum_{y'=1}^{N} I_t(x, y) \quad (4)$$

A motion in block (u, v) is detected if the maximum absolute difference in any of the computed moments between two consecutive frames is larger than a threshold. i.e., no motion is detected if for all j, $|mx_t^j(u, v) - mx_{t+1}^j(u, v)| < \chi$ and $|my_t^j(u, v) - my_{t+1}^j(u, v)| < \chi$. In some tests $\chi = 0.3$.

The motion-based saliency $S_{MD}(x, y)$ is set to one if the block $A_{(\lfloor x/N \rfloor \times \lfloor y/N \rfloor)}$ has motion, and zero otherwise. It is noted that the above motion detector can be replaced by other block-based/pixel-based motion detectors, such as the simple "Mean Absolute Difference" block based motion detector.

According to another embodiment of the invention the motion based saliency of a pixel can be responsive to the amount of motion. Accordingly, the motion based saliency can have weights that range between (for example) zero and 1. Higher motion values will result in lower motion based saliency values. This can include: (i) Using the motion based saliency, to construct a new time weighting matrix, thus achieving more "flexible" solution in high motion areas; (ii) building a weighting matrix that reflects a difference between "1" and the values of a motion based saliency matrix; (iii) utilizing this matrix when solving various constraints.

Figure 5:
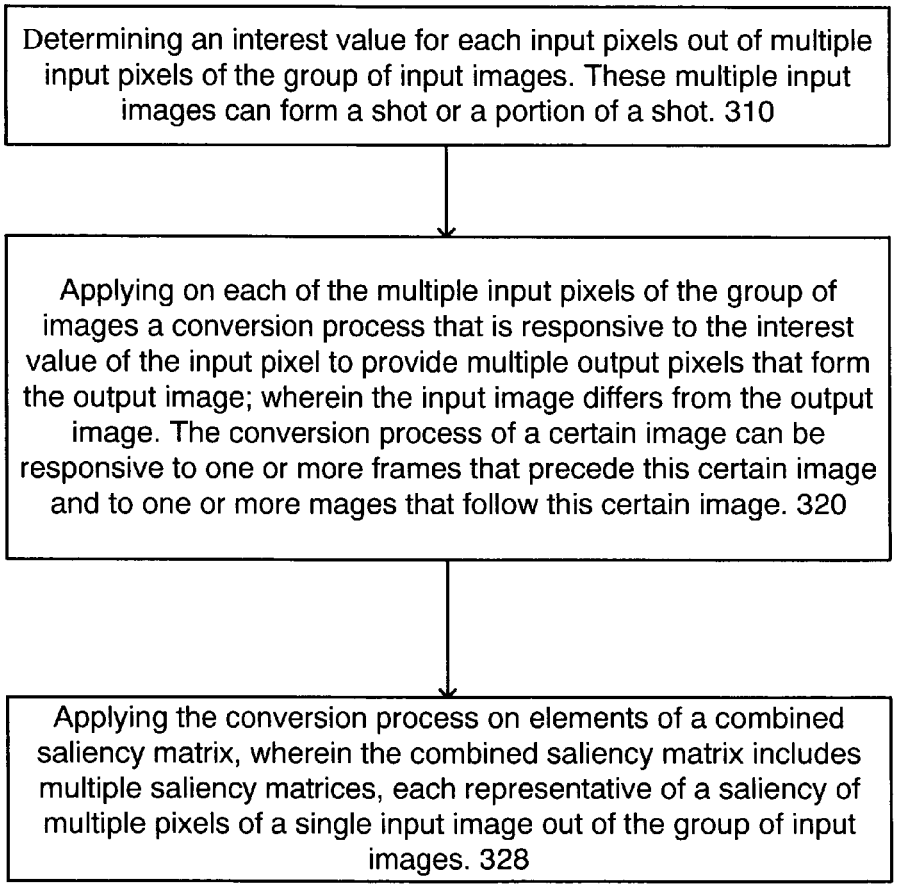
FIG. 5 illustrates a flow chart of a method according to an embodiment of the invention.

As can be seen in FIG. 5' the moving objects gain saliency, thus seizing a larger area in the retargeted video.

Optimization

It is suggested to apply a conversion process that is responsive to an importance of an input pixel. It includes finding an optimal mapping between the source image (input image) and the retargeted image (output image) and especially solving a sparse linear system of equations, conveniently, by applying a least squares manner solution. A more natural formalization is to cast the problem as a constrained linear system. This way one can guarantee that no pixel falls out of bounds and that the mapping preserves the order of the pixels along the scan lines in the image. However, the solution to the unconstrained system is more efficient, and, in practice, the mappings recovered using the unconstrained systems of equations do not contain noticeable artifacts due to changes in the order of the pixels. It is noted that the "least square" measure used to minimize the cost function can be replaced by any error measuring function, such as the $L_1$-Norm.

In the retargeting process a pixel (i,j) in frame t of the video is being mapped into a pixel in frame t of the output video with some computed location $(x_{i,j,t}, y_{i,j,t})$. Hence, there is twice the number of variables ($x_{i,j,t}$ and $y_{i,j,t}$) to solve for then the number of pixels in the input video. A computation of the y variables can be made separately from the computation of the x variables, using the same linear method (described below). The mapping computation is done one frame at a time (see below), and so the system of equations has (approximately) the same number of unknowns as the number of pixels in one input frame.

Consider the problem of recovering the new x-axis locations $x_{i,j,t}$ of pixels (i,j), i=1 ... $C_{Width}$, j=i ... $C_{Height}$, in frames t=1 ... $C_{Duration}$. The problem of determining $y_{i,j,t}$ is the transpose of this problem and is solved in a similar manner. Also, consider first the more applicable problem, in which frame should also be shrieked, i.e., to map the frame to a narrower frame with width $C_{TargetWidth} < C_{Width}$. The expanding problem is similar, though its goal is more application dependent.

There are four types of constraints. First, each pixel to be at a fixed distance from its left and right neighbors. Second, each pixel needs to be mapped to a location similar to the one of its upper and lower neighbors. Third, the mapping of a pixel at time t (current input image) needs to be similar to the mapping of the same pixel at time t+1 (previous input image). The forth constraint fits the warped locations to the dimensions of the target video frames.

Importance Modeling.

If a pixel is not "important" it can be mapped close to its left and right neighbors consequently blending with them. An "important" pixel, however, needs to be mapped far from its neighbors, thus a region of important pixels is best mapped into a region of a similar size. These insights are formulated into equations stating that every pixel should be mapped at a horizontal distance of 1 from its left and right neighbors. These equations are weighted such that equations associated with pixels with higher importance-score are more influential on the final solution. The first type of equations is therefore:

$$S_{i,j,t}(x_{i,j,t} - x_{i-1,j,t}) = S_{i,j,t} \quad (5)$$

$$S_{i,j,t}(x_{i+1,j,t} - x_{i,j,t}) = S_{i,j,t}$$

More precisely, since the at least-squares manner solution is applied then an equation arising from a pixel of importance $S_{i,j,t}$ is as influential as $$\frac{S_{i,j,t}^2}{S_{i',j',t'}^2}$$

equations arising from a pixel of importance $S_{i',j',t'}$.

It is noted that S is the saliency matrix of Eq. (1), except the time index appears explicitly. Note that the equation looking right from pixel (i−1,j) can be combined with the equation looking left from pixel (i, j) to one equation:

$$(S_{i-1,j,t} + S_{i,j,t})(x_{i,j,t} - x_{i-1,j,t}) = (S_{i-1,j,t} + S_{i,j,t}) \quad (6)$$

Boundary Substitutions.

In order to make the retargeted image fit in the new dimensions a constraint is added that defining the first pixel in each row of the frame (1, j, t) to be mapped to the first row in the retargeted video, i.e., $\forall j, \forall t\ x_{1,j,t} = 1$. Similarly, the last pixel of each row is mapped to the boundary of the remapped frame: $\forall j, \forall t\ x_{C_{Width},j,t} = C_{TargetWidth}$.

Since the mappings of the first and last pixels in each row are known, there is no need to have unknowns for them. Instead, it is substituted with the actual values whenever $x_{1,j,t}$ or $x_{C_{Width},j,t}$ appear in Eq. (6).

Spatial and Time Smoothness

It is important to have each column of pixels in the input image mapped within the boundaries of a narrow strip in the retargeted image. Otherwise, the image looks jagged and distorted. These type of constraint are weighted uniformly, and take the form:

$$W^s(x_{i,j,t} - x_{i,j+1,t}) = 0 \quad (7)$$

In the system $W^s = 1$. In order to prevent drifting, a similar constraint is added that states that the first and the last pixels of each column have a similar displacement.

$$W^s(x_{i,1,t} - x_{i,C_{Height},t}) = 0 \quad (8)$$

The mapping also has to be continuous between adjacent frames, as stated bellow:

$$W_{i,j,t}^t(x_{i,j,t} - x_{i,j,t-1}) = 0, \quad (9)$$

where, in order to prevent distortion of faces, the weighting depends on the face detector saliency map $W^t = 0.2(1 + S_F)$. Note that according to an embodiment of the invention in on line more (real time mode) the resources do not necessarily allow to build a system of equations for the whole shot. Instead mapping is computed for each frame given the previous frame's computed mapping. This limited-horizon online time-smoothing method and, as illustrated in FIG. 6' can improve results significantly.

Altering the Aspect Ratio of the Input Image

Examples of aspect ratio altering are exhibited in FIG. 7' and in other figures throughout this manuscript.

The format of the retargeted videos is as follows: each frame is divided into three sub frames. The bottom one is the original video frame. The top right sub-frame is the result of applying bi-cubic interpolation to obtain a new frame of half the input width. The top-left sub-frame is the retargeted result.

Figure 1B:
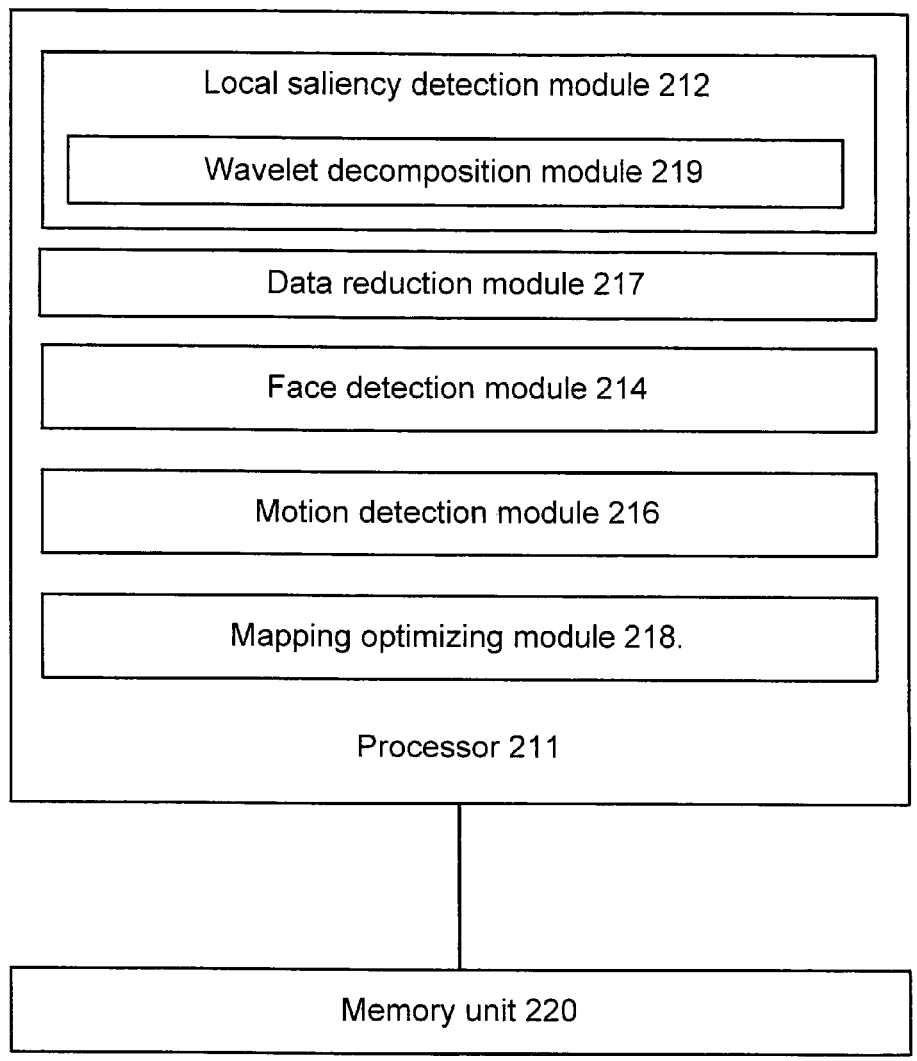
FIG. 1b illustrates a system according to another embodiment of the invention.

While the method does not explicitly crop frames, whenever the unimportant regions in the frame lie away from the frame's center, an implicit cropping is created. See, for example, the retargeting result of the sequence Akiyo (FIGS. 1'a-1'c). Many pixels at the left and right sides of the input frames are mapped into the first and last few columns of the retargeted frames, hence disappearing. FIG. 1a illustrates an original frame from the standard benchmark news sequence "Akiyo", FIG. 1b illustrates a half width retargeted frame achieved by applying method 100 and FIG. 1c illustrates a half width retargeted frame achieved with a prior art transformation.

Down-Sizing Results

The down-sampling results (preserving the aspect ratio) are exhibited in FIG. 8'.

The x-axis and the y-axis warps were computed independently on the original frame and then applied together to produce the output frames. As can be seen, there is a strong zooming-in effect in our results, as necessitated by the need to display large enough objects on a small screen.

It is noted that by using a global error measuring function (such as least squares) the solution tends to uniformly distribute the error across the whole image, rather than concentrate it locally.

Video Expanding

The method can also be used for video expanding. In such a case, however, the desired output depends on the application. In one application, for stills, the task is to keep the original size of the salient objects, while enlarging the video by filling-in the less salient locations with unnoticeable pixels. For such a task, the method can work without any modifications.

In another application, one would like the salient objects to become larger without creating noticeable distortions to the video. A related task is foreground emphasis through non-homogenous warping in-place, where the dimensions of the video remain the same (salient objects are increased in size on the expense of less salient regions). To apply the method in these cases, we need to alter Equation (6) to have the preferred inflating ratio on the right-hand-side. If given by the user or by some heuristic, this is a simple modification. For an inflation by a fixed factor of two where the width is increased and the height remains the same.

According to another embodiment of the invention the device and method are adapted to compensate for camera motion, camera zoom-out and camera zoom-in. Accordingly, the method can compensate for (or substantially ignore) motion introduced by camera manipulation and not by an actual movement of the object. This stage can involve incorporating global affine motion registration, into the solution of the optimization problem. In such a case the global motion is compensated before the optimization stage, and added/subtracted from the optimization solution.

According to another embodiment of the invention the method and device can be used to convert an input video stream to a shorter output video stream. This can be applied by computing an optimal per-pixel time warping via a linear system of equations. Each pixel will be mapped to a time-location in the output video that is similar to that of its spatial neighbors. Important pixels are to be mapped to locations in time distinct from their time-line neighbors. Each frame in the output video is assembled using several input frames, such that moving objects do not overlap.

Data Reduction

According to an embodiment of the invention the conversion process can be simplified, and additionally or alternatively, applied on multiple frames at once, by reducing the amount of information that is processed during the conversion process. For example, after the importance of each pixel of a frame is calculated, a smaller information set can be used when calculating the conversion process. The smaller information set can include multiple variables, each representative of an importance of multiple pixels, it can include only importance information of a sub set of the pixels, and the like. The data reduction can be implemented by various mathematical manners such as but not limited to averaging, quantizing, sub-set selection and the like.

For example, assuming that an input saliency matrix (which includes information about all pixels of the frame) has G elements, then a reduced matrix can include fewer elements (for example G/R). After the smaller matrix is used during the conversion process the results are up-scaled, for example by using a bilinear filter, a Bi-cubic filter, and the like.

Group of Frame Processing

According to an embodiment of the invention the conversion process can be applied on a group of frames. This group can form a shot or a portion of the shot. When the conversion process is applied on frames of a sequence of consecutive frames then the time smoothness can be further improved as a frame is processed not just in relation to a previous frame but also in relation to one or more following frames.

Conveniently, a single conversion process can be applied on a group of frames after performing data reduction on each frame, but this is not necessarily so and depends upon the number of frames, the computational resources and memory resources that can be used during the conversion process and timing requirements as it can be harder to provide real time processing or even almost real time processing on a group of frames.

For example, assuming that the group of images form a shot the processing can include: (i) calculating the saliency of every frame in the shot; resize each saliency matrix (Width× Height) to a reduced matrix (Width×{Height/ReductionFactor}) using bilinear/bicubic interpolation, (ii) generate a combined saliency matric that includes the different reduced matrices)—for example by concatenate the different reduced saliency matrices one after the other to provide, wherein the size of the combined saliency matric has the following dimensions: Width×(Height*NumberOfMatrices/Reduction Factor); (iii) calculating the optimization matrix with various constraints, such as: (iii.a) $X(i,j,t)-X(i,j+1,t)=1$; (iii.b) $X(i,j,t)-X(i+1,j,t)=0$; (iii.c) $X(i,j,t)-X(i,j,t+1)=0$; (iii.d) $X(i,1,1)=1$; (iii.e) $X(i,Width,NumberOfFrames)=Target-Width$; (iv) adding weights; (v) solving the linear system; and (vi) mapping each frame using the upscale solution.

Panning

Panning includes emulating a movement of a camera, such as a horizontal movement or rotation. Panning can be introduced when the conversion process is applied on a group of frames. In this case the panning can be represented by selecting portions of a larger frame, wherein the selection of portions provides a panning effect. In this case the conversion process can include mapping pixels of an input frame (that its location within the larger frame changes over time) to an output frame.

Conveniently, these mentioned above varying boundaries are includes in the set of constraints that are solved by the conversion process.

For example, assume that the variable Pan_t is the horizontal panning of frame t. It differs over time to provide the panning effect. Then the conversion process should take into account the following constraints: (ia) $X(i,1,t)-Pan\_t=1$; (ib) $X(i,n,t)-Pan\_t=new\_width$; (ic) $X(i,j,t)+Pan\_t-X(i,j,t+1)-Pan\_t+1=0$//times some weighting (I use 0.11); (ii) $Pan\_t-Pan\_\{t+1\}=0$; //times some weighting (I use 0.000001); and (iii) $Pan\_1=0$ Under these constraints the linear system is solved. For each frame a solution-matrix is provided and Pan_t can be subtracted from it. (iv) the solution matrix is upscaled to the original frame size. (v) The frame is remapped.

A device is provided. The device can include hardware, software and/or firmware.

FIG. 1a illustrates device 200 according to an embodiment of the invention. Device 200 includes a processor 210 and memory unit 220. It can be connected to a display or a printer or can include at least one of these components. Memory unit 220 is adapted to store an input image and processor 210 is adapted to: determine an importance value for each input pixels out of multiple input pixels of an input image and apply on each of the multiple input pixels a conversion process that is responsive to the importance value of the input pixel to provide multiple output pixels that form the output image; wherein the input image differs from the output image. Processor 210 can execute code that is stored in a computer readable medium.

Conveniently, processor 210 includes a local saliency detection module 212, face detection module 214, motion detection module 216 and mapping optimizing module 218.

These modules cooperate in order to provide an output image. It is noted that processor 210 can work in an in-line manner, in a partially off-line manner or entirely in an off-line manner. It is further notes that various objects of interest can be detected by processor 210, in addition to or instead of faces. Each module can include software, hardware, firmware or a combination thereof.

Local saliency module 212 calculates local saliency values of pixels. Face detection module 214 detects faces. Motion detection module 216 detects motion. Mapping optimizing module 218 applies the conversion process.

Conveniently, processor 210 is adapted to perform at least one of the following or a combination thereof: (i) determine an importance of an input pixel in response to an importance input pixel mask. The mask can be defined by a user; (ii) determine an importance of an input pixel in response to motion associated with each of the multiple input pixels; (iii) determine an importance of an input pixel in response to a saliency score of the input pixels; (iv) determine an importance of an input pixel in response to an inclusion of an input pixel within an input image that represents a face of a person and/or within an object of interest. The object of interest is predefined and can depend upon the expected content of the image. For example, when viewing sport events the ball can be defined as an object of interest; (v) generate an output image such that a distance between output image representations of a pair of adjacent input pixels is responsive to an importance of at least one of pair of adjacent input pixels. Thus, for example, a pair of important input image pixels can be mapped to a pair of output image pixels while less important pair of input pixels can be mapped to the same pixel or be mapped to output pixels whereas the distance between their output image representations is less than a pixel; (vi) at least partially compensate for camera induced motion. This motion can result from zoom-in, zoom-out, camera rotation, and the like; (vii) apply an optimal mapping between the input image (original frame or source frame) to the output image (retargeted image); (viii) solve a set of sparse linear equations; (ix) apply a conversion process in response to at least one of the following constraints: each input pixel is mapped to an output pixel that is located at substantially a fixed distance from its left and right neighbors; each input pixel is mapped to an output pixel located to substantially a similar location to which upper and lower input pixels are mapped; an input pixel is mapped to an output pixel located substantially at a same location as an output pixel to which the same input pixel at a previous image was mapped; and size and shape of the output image; (x) perform re-sizing (down-sizing, up-sizing, warping, and the like); (xi) alter an aspect ratio.

The processor is adapted to perform at least one of the mentioned above operations by executing code. It is noted that the adaptation involve providing hardware circuitries that can assist in executing one or more of the mentioned above stages. The hardware can include memory circuitry, logic circuitry, filters, and the like.

Conveniently, the input image belongs to an input image sequence and processor 210 is adapted to apply a conversion process in response to a relationship between the input image and at least one other input of the input image sequence.

Processor 210 can execute at least one stage of methods 100 or 300 or a combination thereof. It can, for example, perform data reduction, wavelet decomposition, group of frames processing, and panning.

FIG. 1b illustrates device 201 according to an embodiment of the invention. Device 201 differs from device 200 by including processor 211 that also include a data reduction module 219 and a wavelet decomposition module 217. It is noted that a processor can include only one of these modules. The data reduction and wavelet decomposition stage are further illustrated in FIGS. 2 and 3.

Figure 2:
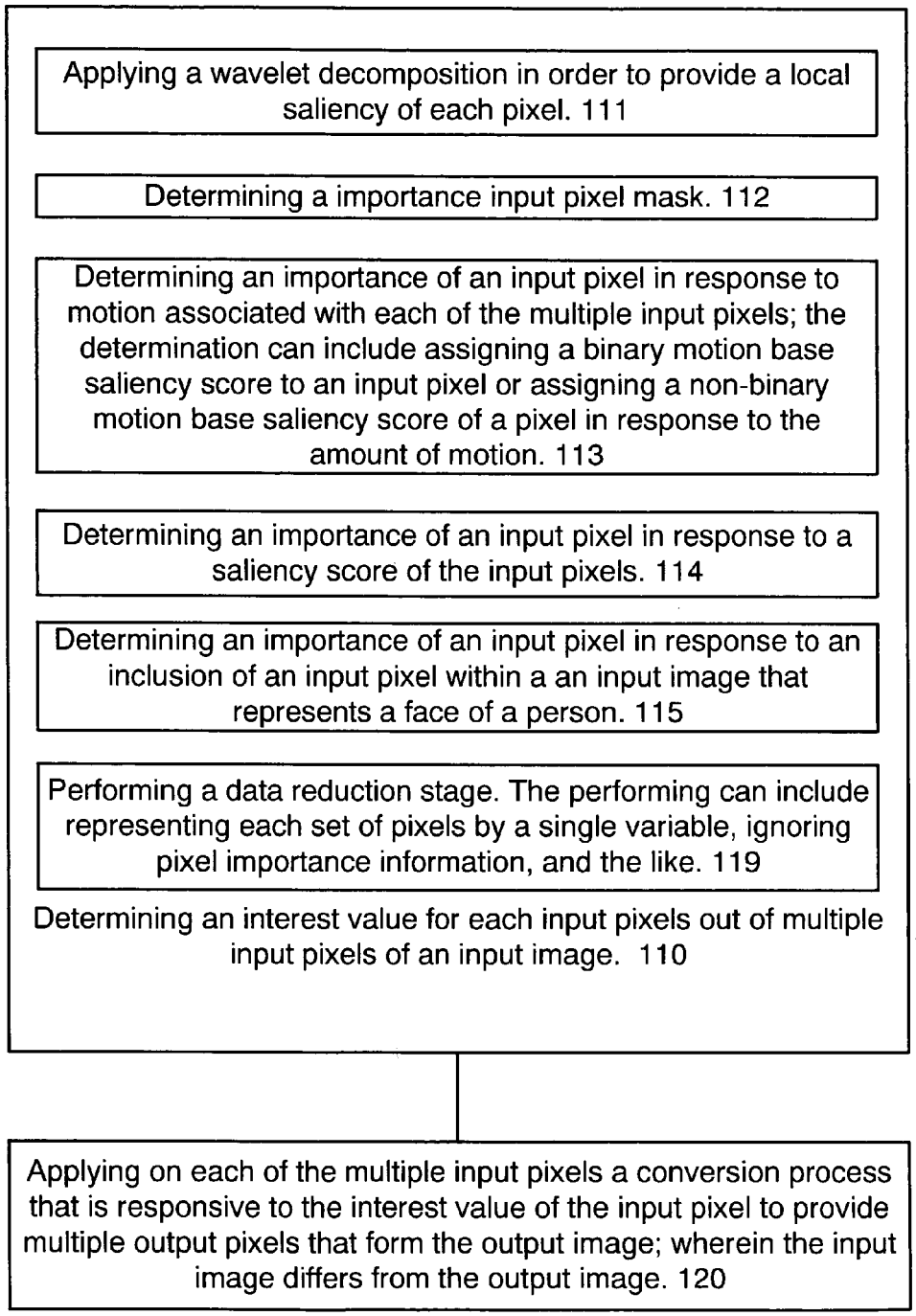
FIG. 2 illustrates a flow chart of a method according to an embodiment of the invention.
Figure 3:
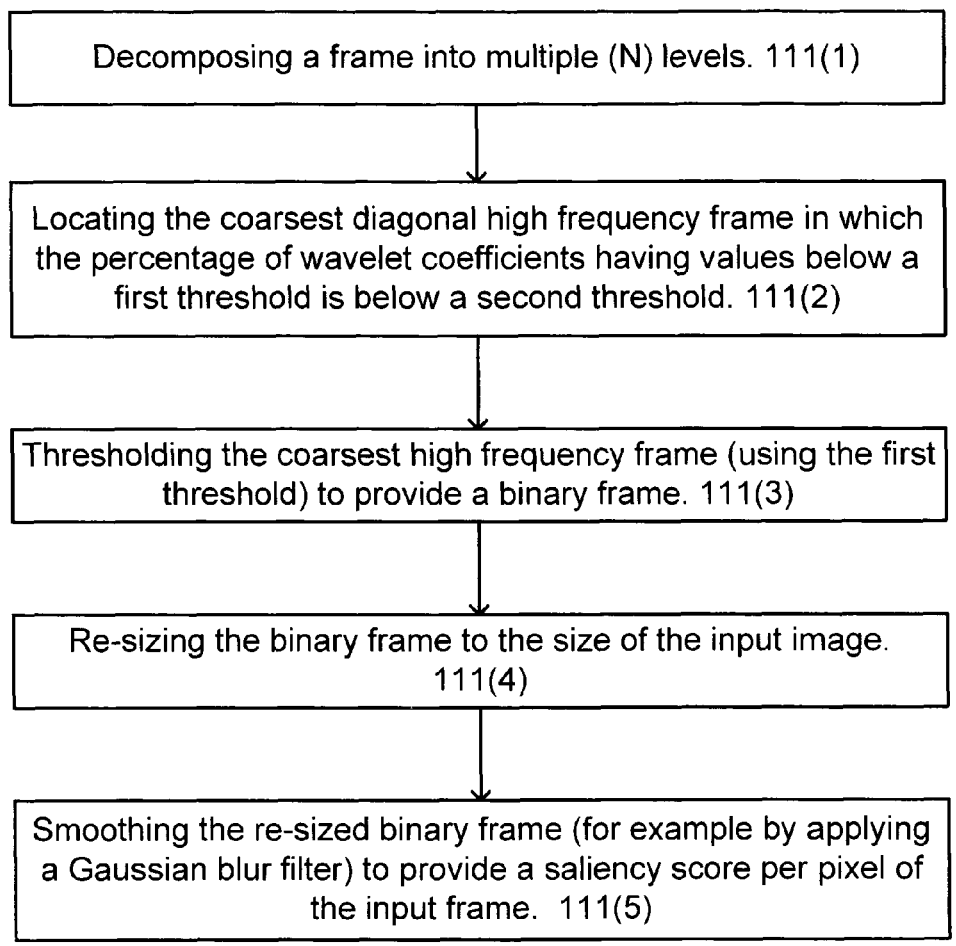
FIG. 3 illustrates a flow chart of a method according to another embodiment of the invention.

FIG. 2 illustrates method 100 according to an embodiment of the invention. Method 100 starts by stage 110 of determining an interest value for each input pixels out of multiple input pixels of an input image. Conveniently, stage 110 includes stage 111 of applying a wavelet decomposition in order to provide a local saliency of each pixel. Stage 111 is illustrated in FIG. 3. Stage 111 can include at least one of the following stages: (i) stage 111(1) of decomposing a frame into multiple (N) levels; (ii) stage 111(2) of locating the coarsest diagonal high frequency frame in which the percentage of wavelet coefficients having values below a first threshold is below a second threshold; (iii) stage 111(3) of thresholding the coarsest diagonal high frequency frame (using the first threshold) to provide a binary frame; (iv) stage 111(4) of re-sizing the binary frame to the size of the input image; (v) and stage 111(5) of smoothing the re-sized binary frame (for example by applying a Gaussian blur filter) to provide a saliency score per pixel of the input frame.

Stage 110 can include at least one of the following: (i) stage 112 of determining a importance input pixel mask, (ii) stage 113 of determining an importance of an input pixel in response to motion associated with each of the multiple input pixels; the determination can include assigning a binary motion base saliency score to an input pixel or assigning a non-binary motion base saliency score of a pixel in response to the amount of motion; (iii) stage 114 of determining an importance of an input pixel in response to a saliency score of the input pixels; (iv) stage 115 of determining an importance of an input pixel in response to an inclusion of an input pixel within a an input image that represents a face of a person.

Stage 110 is followed by stage 120 of applying on each of the multiple input pixels a conversion process that is responsive to the interest value of the input pixel to provide multiple output pixels that form the output image; wherein the input image differs from the output image.

Stage 120 can be preceded by stage 119 of performing a data reduction stage. The performing can include representing each set of pixels by a single variable, ignoring pixel importance information, and the like. FIG. 1 illustrates stage 119 as being included in stage 110.

FIG. 4 illustrates various stages that can be included in stage 120. It is noted that some of the stages are overlapping. Conveniently, stage 120 can include at least one of the following stages or a combination thereof: (i) stage 121 of determining a distance between output image representations of a pair of adjacent input pixels is responsive to an importance of at least one of pair of adjacent input pixels. The distance can range from one or more pixels to a portion of a pixel; (ii) stage 122 of at least partially compensating for camera induced motion; (iii) stage 123 of applying an optimal mapping between the input image to the output image; (iv) stage 124 of solving a set of sparse linear equations; (v) stage 125 of applying a conversion process that is responsive to at least one of the following constraints: each input pixel is mapped to an output pixel that is located at substantially a fixed distance from its left and right neighbors; each input pixel is mapped to an output pixel located to substantially a similar location to which upper and lower input pixels are mapped; an input pixel is mapped to an output pixel located substantially at a same location as an output pixel to which the same input pixel at a previous image was mapped; and size and shape of the output image; (vi) stage 126 of re-sizing; (v) stage 127 of altering an aspect ratio.

Conveniently, the input image belongs to an input image sequence and wherein the applying is responsive to a relationship between the input image and at least one other input of the input image sequence.

FIG. 5 illustrates method 300 according to an embodiment of the invention.

Method 300 differs from method 100 by the processing of a group of input images.

Method 300 starts by stage 310 of determining an interest value for each input pixels out of multiple input pixels of the group of input images. These multiple input images can form a shot or a portion of a shot.

Stage 310 can resemble stage 110 but it is applied on pixels of a group of images. It can be applied on these pixels simultaneously.

Stage 310 can include stages that are analogue to stages 111-115 and 119. For example, stage 310 can include applying a data reduction stage to provide results of a data reduction stage. It this case stage 320 will include applying on each of the results of the data reduction stage a conversion process that is responsive to the importance value of the results to provide converted results.

Stage 310 is followed by stage 320 of applying on each of the multiple input pixels of the group of images a conversion process that is responsive to the interest value of the input pixel to provide multiple output pixels that form the output image; wherein the input image differs from the output image. The conversion process of a certain image can be responsive to one or more frames that precede this certain image and to one or more mages that follow this certain image.

Stage 320 can include stages that are analogue to stages 121-127. It can also include stage 328 of applying the conversion process on elements of a combined saliency matrix, wherein the combined saliency matrix includes multiple saliency matrices, each representative of a saliency of multiple pixels of a single input image out of the group of input images.

Stages 310 and 320 can be executed in a manner that generates a panning effect. Assuming that a sequence of K images (IA(1) . . . IA(K)) form a shot, that the panning effect includes a movement of the camera from left to right, and that portions of size P×Q pixels should be regarded as the input image. In this case the first input image will include the leftmost P*Q pixels of IA(1), the second input image will include a slightly shifted portion of P×Q pixels of IA(2) and the K'th input image should include the rightmost P*Q pixels of IA(K). The pixels that belong to these input images can be processed by applying stages 310 and 320 to provide a panning effect.

Sample Images

FIG. 12a is an original image. FIG. 12b is a half width retargeted output image generated by applying method 100. FIG. 12c is a half width retargeted output image generated by applying a prior art method. FIG. 12d illustrates an original image (leftmost image) that undergoes saliency processing, face detection and motion detection, an optimization process (conversion process) and an output frame.

FIG. 13a is an input image while FIG. 13b is a retargeted frame (half width) generated by applying the method 100. It is noted that a cropped window cannot achieve the same frame area utilization.

FIG. 14a is an input frame, FIG. 14b is a gradient map of the input frame with the faces detected imposed, FIG. 14c is a result of a retargeting to half the width without face detection and FIG. 14d is a result of retargeting with face detection.

Figure 15A:
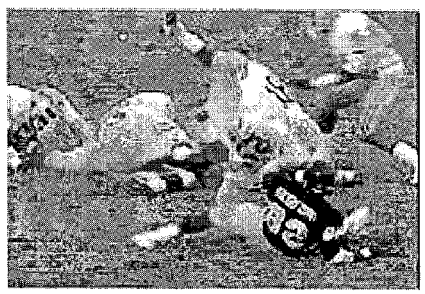
Figure 15B:
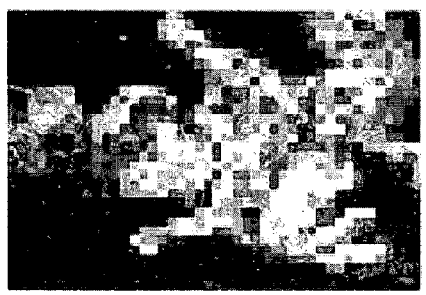
Figure 15C:
Figure 15D:
Figure 15E:

FIG. 15a is an input image taken from the MPEG/ITU-T committee bench-mark video "football". FIG. 15b is a saliency map that includes the motion. FIG. 15c is a result of bi-cubic interpolation to half the width. FIG. 15d is an output image generated by retargeting without motion based saliency and FIG. 15e is the result of retargeting with the full saliency map.

Figure 16A:
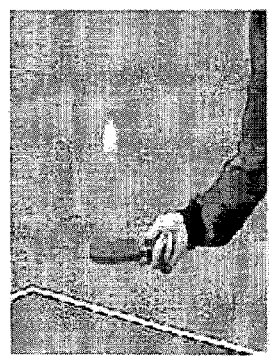
Figure 16B:
Figure 16C:

The top row of FIGS. 16a-16c depicts the retargeting results of a certain frame while the top row of FIGS. 16a-16c depicts the retargeting results of another image. FIG. 16a illustrates a result of a bi-cubic interpolation, FIG. 16b illustrates the result of frame by frame retargeting and FIG. 16c illustrates a time smoothed retargeting. Time smoothing prevents the video from "jumping around".

Figure 17A:
Figure 17B:
Figure 17C:

Each of FIG. 17a-17c illustrates an original frame (bottom of each figure), a result of a bi-cubic interpolation (top-right) and a result of applying the method 100 (top-left). The latter retargeting method prevents much of the thinning effect caused by the rescaling and preserves details.

Figure 18A:
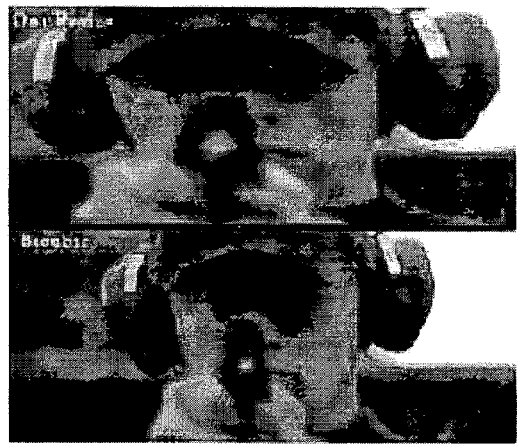
Figure 18B:
Figure 18C:
Figure 18D:
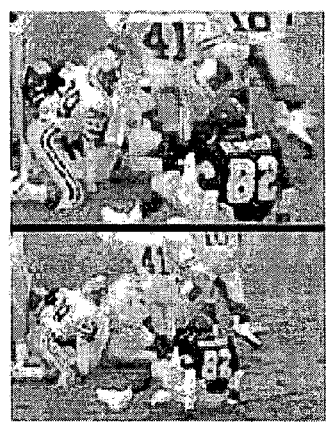

Each of FIG. 18a-18c illustrates a result of a bi-cubic interpolation (bottom) and a result of applying the method 100 (top). The latter retargeting method applies a non-homogenous zooms to the objects of interest.

Figure 19A:
Figure 19B:
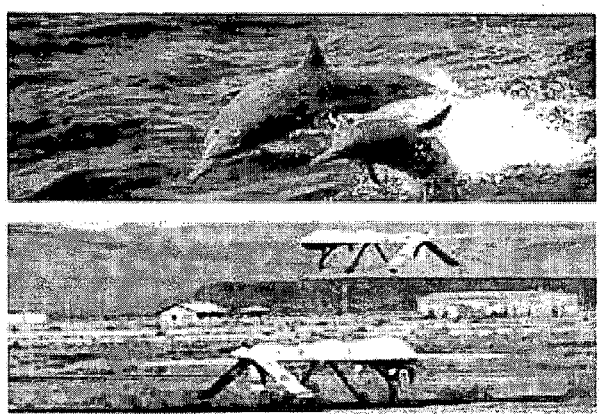

FIG. 19a illustrates an input frame while FIG. 19b is a two fold wider retargeted output image generated by applying the method 100.

APPENDIX A

APPENDIX A illustrates a method and system for providing an output image. Especially, a method and device for inhomogeneous 2D texture mapping guided by a feature mask is provided. The mapping can apply one or more conversion processes that are responsive to the feature mask. The mapping preserves some regions of the image, such as foreground objects or other prominent parts. The method is also referred to as the method illustrated in appendix A. This method includes receiving an input frame and a feature mask defined by a rough selection of the features interest map and mapping them (by solving a sparse equation set) to an output frame. If a rigid transformation (rigid mapping) is applied then the featured indicated in the feature mask can undergo (during the mapping) a similarity transformation, possibly at the expense of the background regions in the texture that are allowed to deform more. If a similarity transformation (similarity mapping) is applied then the size of a feature can be slightly changed.

Appendix A illustrates a method for providing an output image, the method includes: receiving an input frame and a feature mask defined by a rough selection of the features; applying a mapping process to provide the output image; wherein the mapping process differentiates between pixels of features included in the feature mask and between other pixels; wherein the applying comprises solving a sparse equation set.

Conveniently, the mapping process applies a similarity transformation on pixels of features included in the feature mask.

Conveniently, the mapping process allows pixels of features included in the feature mask to slightly change.

Appendix A illustrates a device for providing an output image, the device includes: a memory unit adapted to store an input image and a feature mask defined by a rough selection of the features; and a processor, adapted to: apply a mapping process to provide the output image; wherein the mapping process differentiates between pixels of features included in the feature mask and between other pixels; wherein the applying comprises solving a sparse equation set.

Conveniently, the processor applies a similarity transformation on pixels of features included in the feature mask.

Conveniently, the processor applies allows pixels of features included in the feature mask to slightly change.

Appendix A illustrates a computer readable medium that stores instructions for: receiving an input frame and a feature mask defined by a rough selection of the features; applying a mapping process to provide the output image; wherein the mapping process differentiates between pixels of features included in the feature mask and between other pixels; wherein the applying comprises solving a sparse equation set.

Conveniently, the computer readable medium stores instructions for applying a similarity transformation on pixels of features included in the feature mask.

Conveniently, the computer readable medium stores instructions for allowing pixels of features included in the feature mask to slightly change.

Instead of cropping the frames, the device and method shrink them while respecting the salient regions and maintaining the user experience. The proposed device and method are efficient and the optimization stage includes of solving a sparse N×N system, where N is the number of pixels in each frame. The method and device are well adapted to batch applications, but are designed for streaming video since they compute the warp of a given frame based on a smalltime-neighborhood only, and are is fast enough to avoid delays. It is noted that the method and system can also perform up-scaling.

The method and device can be applied to solve several retargeting tasks:

video down/up-sampling, aspect ratio alterations, and non-homogenous video expansion, video abstraction, object removal from a video, and object insertion to video while respecting the saliency. It is noted that object removal is done by zeroing the saliency measure of the object while object insertion is implemented by placing a new blob of pixels in between existing image pixels and setting it the importance of the new pixels to a large value.

The method of appendix A does not distort the regions of interest.

The method of appendix A and the system are able to arbitrarily warp a given image while preserving the shape of its features by constraining their deformation to be a similarity transformation.

In particular, the method and system allow global or local changes to the aspect ratio of the texture without causing undesirable shearing to the features. The algorithmic core of the method and system is a particular formulation of the Laplacian editing technique, suited to accommodate similarity constraints on parts of the domain.

The method illustrated in appendix A is useful in digital imaging, texture design and any other applications involving image warping, where parts of the image have high familiarity and should retain their shape after modification.

In 2D texture mapping applications, images are mapped onto arbitrary 2D shapes to create various special effects; the texture mapping is essentially a warp of the texture image, with constraints on the shape of the boundary or possibly the interior of the image as well. Such texture mapping is common in graphical design and publishing tools, as well as 2D and 3D modeling and animation applications. Commercial design tools usually provide a library of predefined warps, where the user only needs to select the desired mapping type and possibly tune a few parameters. Another option is to interactively design the texture map by selecting and transforming points or curves on the original image; the mapping is computed so as to accommodate such user constraints. It is also possible to apply free-form deformations with grid-based controls.

Texture manipulation in 2D is commonly applied by modelers when texturing 3D models: the texture map often needs to be adjusted and aligned to match particular features of the 3D surface. Constrained texture mapping methods have been developed for this purpose where the user supplies point correspondences between the texture and the 3D model, and a suitable mapping is computed automatically.

Most image mapping and manipulation techniques treat the entire texture image homogeneously. When the deformation applied to an image introduces shearing, e.g. in the simplest situation where the aspect ratio of an image is altered by non-uniform scaling, all the image features are distorted. This may be disturbing when the image contains features with highly familiar shape, such as humans, animals, prominent geometric objects, etc. A typical example of a simple image transformation is shown in FIG. 12a, where the shear and stretch effects distort the images of the children in a quite unsatisfactory manner.

The method illustrated in appendix A is capable of preserving the shape of masked regions of the texture while warping the image according to the user specifications. This feature-aware texture mapping is guided by a feature mask defined by a rough selection of the features; in the mapping result, these features will undergo solely a similarity transformation, possibly at the expense of the background regions in the texture that are allowed to deform more. This method can relate to the texture optimization techniques of Balmelli et al., where the texture map is warped to allow higher pixel budget for the high-frequency details of the texture image.

At a first glance, it seems that a feature-preserving mapping could be achieved by cutting out the features, warping the rest of the image as desired and then pasting the features back and adjusting their orientation and scale. However, this poses several difficulties: (i) precise segmentation of the features with correct alpha-mattes for subsequent seamless compositing is required; (ii) it is not clear how to prescribe the similarity transformation of the features; (iii) texture synthesis heeds to be applied for the holes that are likely to form around the features; alternatively, the pasted features could overlap with parts of the warped texture, causing information loss. The above tasks are quite complex; moreover, the tuning of such an algorithm would require significant amount of user interaction. In contrast, our method does not require a highly accurate matte but rather a loose selection of the features, which can be done using standard selection tools. The method illustrated in appendix A produces coherent, smooth image warps by drawing upon the recent machinery of differential representations and deformation techniques.

Feature-Aware Mapping

The suggested feature-preserving texture mapping technique is first described assuming that an input warping function $W: R^2 \to R^2$ is given. Assume that the input image is represented by a regular pixel grid of dimensions m×n. The grid of the input image is denoted by $G=(V,E,K)$, where $V=\{v_1, v_2, \ldots, v_N\}$ is the set of node positions (N=mn), $E=\{(i,j)\}$ is the set of directed edges between the nodes and K is the set of quad faces of the grid. Throughout the discussion it is assumed that G is a 4-connected quad grid, although the algorithm can be easily extended to any general meshing of the image. It is assumed that the values of the input mapping W on all the grid nodes $v_i$ are known.

The user provides a feature mask that marks the parts of the image whose shape should be preserved. The mask is denoted by $M=\{m_1, \ldots, m_N\}$, such that $m_i=1$ if pixel i belongs to a feature and $m_i=0$ otherwise. The feature nodes indices are thus $F=\{i \text{ s.t. } m_i=1\}$. The method 100 partitions F into its connected components: $F=F_1 \cup F_2 \cup \ldots \cup F_d$ (see FIG. 2(e)). The method of appendix A aims to find a mapping of the original grid G that is as close as possible to the input warp W and respects the shape of the features specified by the mask M. It is desired to preserve the shape of all the quads contained in the features, meaning that they should undergo solely a similarity or rigid transformation. Rigid transformation implies that the size of the features will be preserved, whereas a similarity transformation allows varying the size according to the warping function W. The user can be left with the choice between rigid and similarity behavior.

A proper shape preserving transformation for each quad $Q=(v_{i_1}, v_{i_2}, v_{i_3}, v_{i_4})$ that has at least one node in F is provided. W(Q) is approximated with a rotation/similarity transformation, by taking the linear component of W and extracting the rotation from it by means of the polar decomposition.

Specifically, denote $W(Q)=(v_{i_1}', v_{i_2}', v_{i_3}', v_{i_4}')$; denote by $$v = \frac{1}{4} \sum_{k=1}^{4} v_{i_k}$$

the centroid of Q; the centered vertices are then $u_{i_k} = v_{i_k} - v$ (and similarly, $u_{i_k}'$ or W(Q)). The method can linearly approximate the homogeneous part of W on Q by:

$$T_{W,Q} = [u_{i_1}' u_{i_2}' u_{i_3}' u_{i_4}'] \cdot [u_{i_1} u_{i_2} u_{i_3} u_{i_4}]^*, \quad (10)$$

where A* denotes the pseudoinverse of matrix A. In fact, $T_{W,Q}$ is an approximation of the Jacobian of W on Q; if given the analytical expression of W, $T_{W,Q}$ can be replaced by the Jacobian of W at, say, $v_{i_1}$.

To extract the rigid component of $T_{W,Q}$ the method performs its singular value decomposition: $T_{W,Q}=U\Sigma V^T$; the rigid component of $T_{W,Q}$ is then $$R_{W,Q} = VU^T. \quad (11)$$

To devise the feature-preserving mapping, the method formulates the following optimization problem: it would be desired that all the elements outside of F to undergo a transformation as close as possible to W, and all the elements in F should undergo solely the rigid (or similarity) component of W. It is convenient to formulate the requirements of this optimization per quad. If quad $Q=(v_{i_1}, v_{i_2}, v_{i_3}, v_{i_4})$ belongs to a feature (i.e. it has at least one node in F), the method defines the following four equations related to its four edges:

$$\tilde{v}_{i_{k+1}} - \tilde{v}_{i_k} = R_{W,Q}(v_{i_{k+1}}) - R_{W,Q}(v_{i_k}), k=1,\ldots,4 \text{ cyclically} \quad (12)$$

where $\tilde{v}_{i_k}$ are the unknown deformed grid nodes. Similarly, if Q does not belong to a feature, we add the following four equations for its edges:

$$\tilde{v}_{i_{k+1}} - \tilde{v}_{i_k} = W(v_{i_{k+1}}) - W(v_{i_k}), k=1,\ldots,4 \text{ cyclically} \quad (13)$$

Overall, the method of appendix A obtains an over-determined system of 4|K| equations in 2N unknowns, which can be solved in the least squares sense. Note that the system is separable in the two coordinates, thus we can solve for x and y separately, with the system matrix containing N columns. The method can constrain the boundary nodes to their positions under W to make the optimization problem well-posed:

$$\tilde{v}_i = W(v_i), \forall i \in \partial G. \quad (14)$$

Solving for $\tilde{v}_1, \ldots, \tilde{v}_N$ will provide a mapping that rigidly preserves the features, including their size. To obtain a shape-preserving mapping that allows appropriate scaling of the features, the method can modify the local transformations $R_{W,Q}$ as follows.

The method estimates that the average scaling of each connected feature component $F_i$ under W by observing the singular values of the transformations $T_{W,Q}$. For each element $Q \in F_i$, the method takes the smaller singular value of $T_{W,Q}$, and average those values over all $Q \in F_i$, obtaining the average scale factor $\lambda_i$. Conveniently, the smaller singular values are averaged, because intuitively, if the image is stretched in one direction, the feature size should remain constant. The target local transformations of the quads in each $F_i$ are thus updated to be $\lambda_i R_{W,Q}$, and Eq. ((2)) is modified accordingly.

Smoothing the Mapping

When the input warp W is largely deforming the geometry of G, feature shape preservation may be compromised. To compensate for such situations, it is useful to apply weights to Eq. ((2)) that is responsible for feature preservation: each side of those equations is multiplied by weight w, (a sample value of $w_F=10$). Since a least-squares system of equations is solved, this multiplication results in $w_F^2$-magnification of the corresponding error terms in the minimization functional, forcing the optimization to respect the features more, at the expense of larger deformation of other areas.

However, since the weights are abruptly discontinuous at the feature boundaries (weighting of 1 outside the feature and $w_f$?1 inside), such solution damages the smoothness of the mapping near the feature boundary. This can be easily corrected by assigning a more smooth weighting function: computing a local distance field to the feature and assigning smoothly decreasing weights for the quads in the vicinity of the feature as functions of the distance field. The equations associated with those "transition-quads" are of type ((2)).

The following polynomial can be used as the decay function:

$$f(x) = \frac{2}{\rho^3} x^3 - \frac{3}{\rho^2} x^2 + 1,$$

(15) where the constant $\rho>0$ controls the extent of the decay; the weights in the intermediate region around the feature boundaries are thus defined as:

$$w(Q) = w_F \cdot f(D(Q)) + 1 \cdot (1 - f(D(Q))), \quad (16)$$

where D(Q) is the value of the distance to the feature at the center of Q. The decay radius p is set to be the width of two grid cells; outside of this radius the weights are set to 1.

Interactive Texture Mapping

Two possible modes of texturing application are differentiated from each other: input-warp mode (described in the previous section) and interactive mode. In both modes, the feature regions of the input image are first specified by a feature mask. In the interactive mode, the user designs the mapping using the standard controls of image boundary editing and/or prescription of inner curve transformations. The mapping is computed taking into account these user-defined constraints and the feature mask, using a deformation technique based on differential coordinates.

These user's manipulations are interpreted by the system as positional constraints on the grid nodes, i.e. simply $$\tilde{v}_i = c_i, i \in U, \quad (17)$$

where U is the set of the nodes constrained by the user and $c_i$ are the new positions for those nodes.

The mapping of the free grid nodes is decided by applying the Laplacian editing optimization. The goal of this optimization is to create a smooth and as-rigid-as-possible mapping of the grid shape that respects the user constraints ((17)).

"As-rigid-as-possible" means that if the user-constraints imply solely a rigid (or similarity) transformation of the grid shape, the optimization technique indeed delivers such transformation; otherwise, the optimization finds a mapping that is locally as close as possible to being rigid, which is perceived as an intuitive result. The optimization involves solving a sparse linear system of size 2N×2N.

Once the mapping function W is established in the above manner, its feature-preserving approximation is created according to the feature mask, as described in Section "Feature-aware mapping" above.

Sample Implementation Details

| Size | setup | Factor | Rhs setup | Solve |
|---|---|---|---|---|
| 50 × 100 | 0.156 | 0.110 | 0.015 | 0 |
| 100 × 100 | 0.375 | 0.250 | 0.031 | 0.015 |
| 100 × 200 | 1.141 | 0.562 | 0.047 | 0.031 |
| 200 × 200 | 2.171 | 1.407 | 0.109 | 0.063 |

Table 1 illustrates timing statistics (in seconds) for the different parts of the mapping algorithm. Sys. setup stands for the setup of the normal equations matrix; Rhs setup denotes the building the right-hand side of the normal equations and Solve stands for the back-substitution. Note that the system setup and matrix factorization is done in a pre-process, once per given image grid.

The algorithmic core of the feature-sensitive texture mapping is the solution of the least-squares optimization expressed by Eqs. ((2)-(3)) and ((14)).

When put together, these equations form an over-determined linear system of the form:

$$A(xy)=(b_x b_y), \quad (18)$$

where $x=(\tilde{x}_1, \ldots, \tilde{x}_N)^T$ are the x coordinates of the deformed grid and $y=(\tilde{y}_1, \ldots, \tilde{y}_N)^T$ are the y coordinates.

The system is separable in the two coordinates, so the system matrix A has N columns. The matrix is very sparse since there are only two non-zero coefficients in each row. The system is solved by factoring the normal equations:

$$A^T A(xy)=A^T(b_x b_y). \quad (19)$$

The Taucs library is used for efficient sparse matrix solvers. Cholesky factorization provides a sparse lower-triangular matrix L such that $$A^T A = LL^T. \quad (20)$$

Then, the equations can solved by double back substitution:

$$Lx_{temp} = A^T b_x$$

$$L^T x = x_{temp}, \quad (21)$$

and in the same fashion for the y component. Thus, a single factorization serves solving for multiple right-hand sides.

The construction of the A matrix, the normal equations matrix and the factorization can be attributed to the pre-process, since they only depend on the grid and the feature map of the input image; the matrix factorization is the most computationally-intensive part, taking a few seconds for grids with several tens of thousands of quads. Once the factorization is computed, back substitution is extremely fast (see Table 1).

When varying the input warp function W, there is only need to update the right-hand side of the system (the $b_x, b_y$ vectors) and perform back-substitution, so the user can experiment with various mappings in real time. Of course, manipulation of very large images may slow down due to the large dimensions of the system matrix; to maintain interactive response in this case the grid is defined to be slightly coarser than the pixel grid of the input image, so that the size of the system remains in the order of 20000-50000 variables. For example, it can efficiently handle an image of 1000×1000 pixels by defining the size of the grid cells to be 5×5 pixels.

Computing the initial mapping by interactively-placed user constrains (Section "Interactive texture mapping") also requires solving a sparse linear system of size 2N×2N. It is done in the same manner: pre-factoring the system matrix and solely varying the right-hand side of the system when the user manipulates the boundary constraints. Since the back-substitution is fast, the manipulation is interactive, as demonstrated in the accompanying video.

The mentioned above feature-sensitive texturing system on a Pentium 4 3.2 GHz computer with 2 GB RAM. It was assumed that the feature mask comes together with the input image, defined in some external image editing software. During the experiments the feature maps were created by Photoshop using the standard selection tools (Magic Wand, Lasso and Magnetic Lasso). The process of feature selection is quite easy since the feature-aware texturing needs only a rough binary matte.

The inventor experimented with various input warping functions that are commonly available in most image editing packages. The results of unconstrained mapping with the mentioned above feature-preserving mapping were compared in various figures. It can be clearly seen in all the examples that the mentioned above mapping preserves the shape of the features while gracefully mimicking the input mapping function. The similarity-preserving mapping allows uniform scaling of the features, and thus it has more freedom to approximate the input mapping. For instance, when the input mapping implies enlargement of the image, the similarity-preserving mapping will allow uniform scaling of the features, whereas the rigid mapping will constrain the features to remain in their original size, thus introducing more stretch to the background areas.

In extreme deformation cases, the feature-aware mapping may introduce fold-overs, which may result in texture discontinuity. Preventing self-intersections within the least-squares optimization is quite difficult; it is noted that the method can be adapted to perform post-processing relaxations to fix the fold-overs.

Sample Images

FIGS. 6a-6b, 7a-7h, 8a-8c, 9a-9d, 10a-10f, 11a-11j illustrate the differences between applying prior art mapping method and applying the method illustrated in appendix A.

Figure 6A:
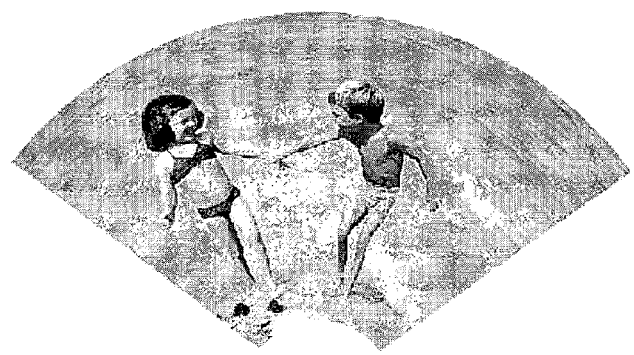
FIGS. 6a-6b, 7a-7h, 8a-8c, 9a-9d, 10a-10f, 11a-11l are input and output images.
Figure 6B:
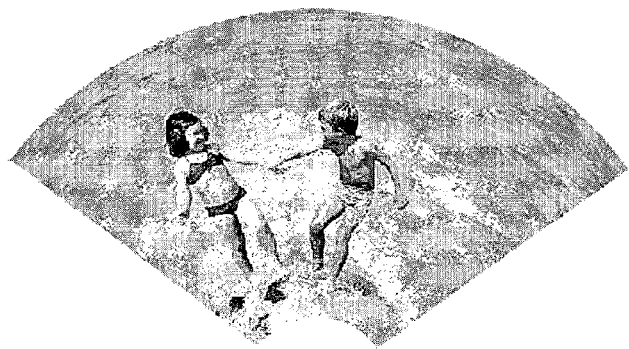

FIG. 6a is the result of applying a prior art mapping process on an image while FIG. 6b is a result of applying the method of appendix A. It is noted that in FIG. 6a the legs of the children are squeezed and their heads are stretched. This affects do not appear in FIG. 6b.

Figure 7A:
Figure 7B:
Figure 7C:
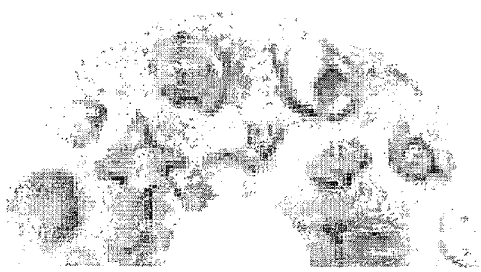
Figure 7D:
Figure 7E:
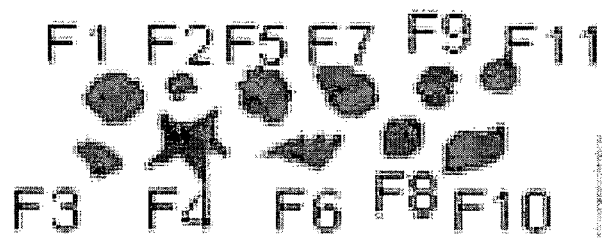
Figure 7F:
Figure 7G:
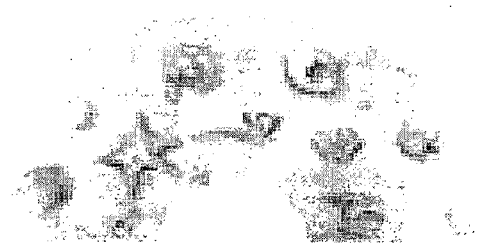
Figure 7H:
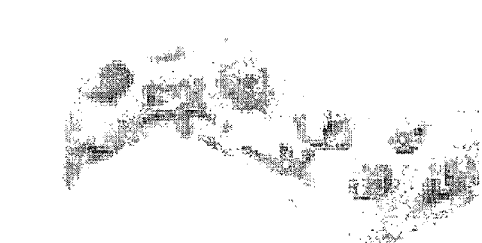

FIG. 7a is an original image. FIGS. 7b, 7c and 7d are the result of applying a prior art mapping process on an image so as to map the image onto a vertically stretched output frame, onto an arc shaped output frame and onto a sinusoidal output frame. FIG. 7e illustrates a feature map (of features F1-F11) that is generated by applying the method illustrated in appendix A. FIGS. 7f, 7g and 7h are the result of applying the method illustrated in appendix A so as to map an image onto a vertically stretched output frame, onto an arc shaped output frame and onto a sinusoidal output frame.

Figure 8A:
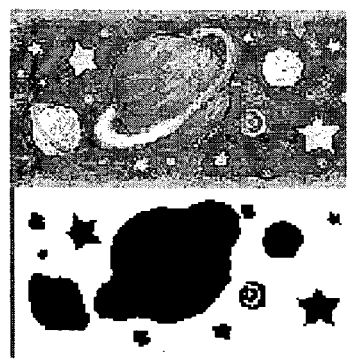
Figure 8B:
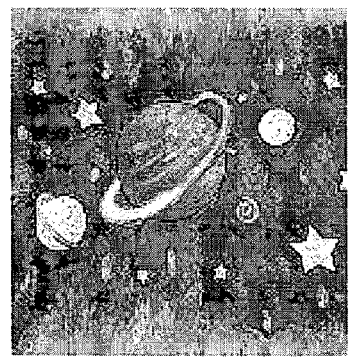
Figure 8C:
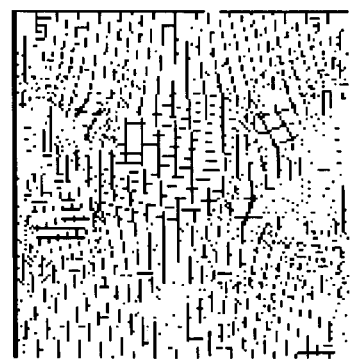

FIG. 8a is an original image. FIG. 8b illustrates a result of applying the method illustrated in appendix A so as to map an image onto vertically (×2) stretched output frame. FIG. 8c illustrates an underlying grid.

Figure 9A:
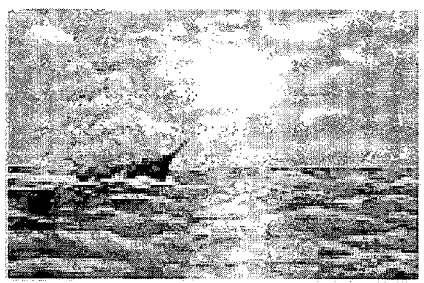
Figure 9B:
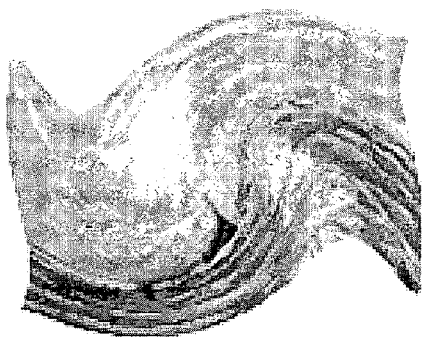
Figure 9C:
Figure 9D:
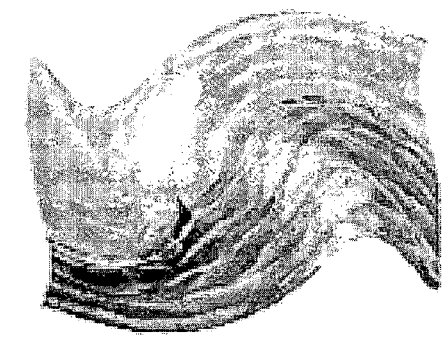

FIG. 9a is an original image. FIG. 9b is the result of applying a prior art mapping process on an image so as to map the image onto a swirl feature the method illustrated in appendix A method according to an embodiment of the invention so as to map the image onto a swirl feature output frame while constraining the size of features. FIG. 9d illustrates a result of applying the method illustrated in appendix A so as to map the image onto a swirl feature output frame while allowing uniform scaling of the features.

Figure 10A:
Figure 10B:
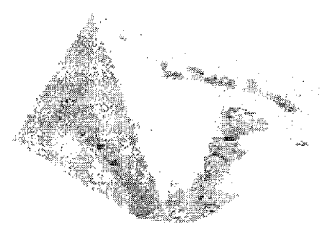
Figure 10C:
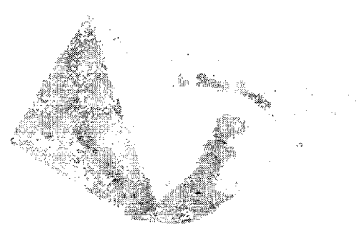

FIG. 10a is an original image. FIG. 10b is the result of applying a prior art mapping process on an image so as to map the image onto three dimensional shape. FIG. 10c illustrates the result of applying the method illustrated in appendix A on an image so as to map the image onto three dimensional shape.

Figure 10D:
Figure 10E:
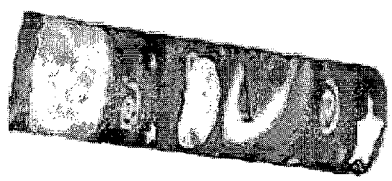
Figure 10F:
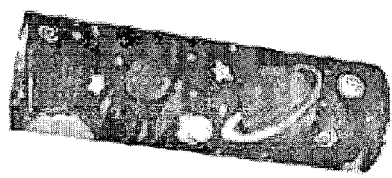

FIG. 10d is an original image. FIG. 10e is the result of applying a prior art mapping process on an image so as to map the image onto another three dimensional shape. FIG. 10f illustrates the result of applying the method illustrated in appendix A on an image so as to map the image onto another three dimensional shape.

Figure 11A:

FIG. 11a is an original image. FIG. 11b is the result of applying a prior art mapping process on an image so as to map the image onto a swirl feature output frame. FIG. 11c illustrates a result of applying the method illustrated in appendix A so as to map the image onto a swirl feature output frame while constraining the size of features. FIG. 11d illustrates a result of applying the method illustrated in appendix A so as to map the image onto a swirl feature output frame while allowing uniform scaling of the features.

Figure 11E:

FIG. 11e is an original image. FIG. 11f is the result of applying a prior art mapping process on an image so as to map the image onto an arc shaped output frame. FIG. 11g illustrates a result of applying the method illustrated in appendix A so as to map the image onto an arc shaped output frame while constraining the size of features. FIG. 11h illustrates a result of applying the method illustrated in appendix A so as to map the image onto an arc shaped output frame while allowing uniform scaling of the features.

Figure 11I:
Figure 11B:
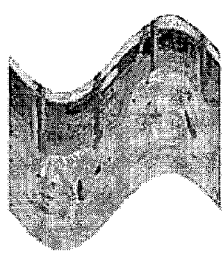
Figure 11F:
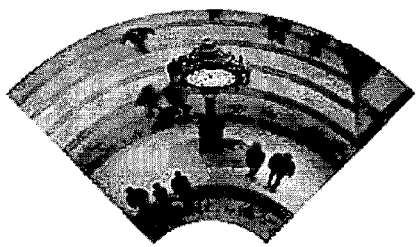
Figure 11J:
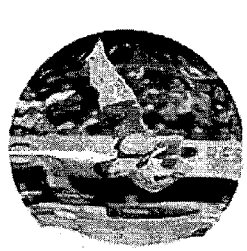
Figure 11C:
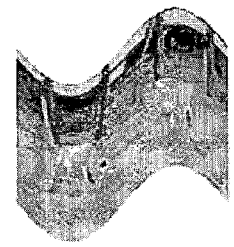
Figure 11G:
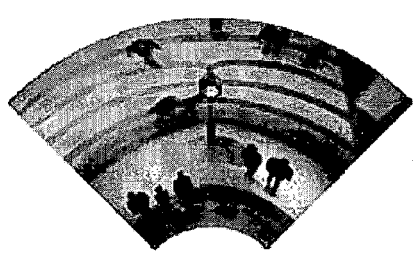
Figure 11K:
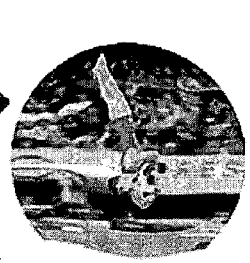
Figure 11D:
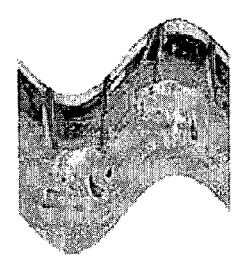
Figure 11H:
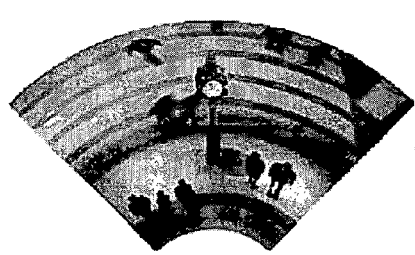
Figure 11L:
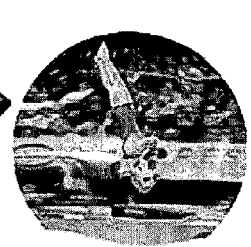

FIG. 11i is an original image. FIG. 11j is the result of applying a prior art mapping process on an image so as to map the image onto a circular shaped output frame. FIG. 11k illustrates a result of applying the method illustrated in appendix A so as to map the image onto a circular shaped output frame while constraining the size of features. FIG. 11l illustrates a result of applying the method illustrated in appendix A so as to map the image onto a circular shaped output frame while allowing uniform scaling of the features.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

We claim:

1. A method for providing an output image, the method comprising: determining an importance value for each input pixels out of multiple input pixels of an input image; applying on each of the multiple input pixels a conversion process that is responsive to the importance value of the input pixel to provide multiple output pixels that form the output image; wherein the input image differs from the output image; wherein the determining is responsive to motion associated with each of the multiple input pixels.

2. The method according to claim 1 wherein the determining is responsive to a saliency score of the input pixels.

3. The method according to claim 1 wherein the determining is responsive to an inclusion of an input pixel within an input image area that represents a face of a person.

4. The method according to claim 1 wherein the determining is responsive to an inclusion of an input pixel within an input image area that represents an object of interest.

5. A method for providing an output image, the method comprising: determining an importance value for each input pixels out of multiple input pixels of an input image; applying on each of the multiple input pixels a conversion process that is responsive to the importance value of the input pixel to provide multiple output pixels that form the output image; wherein the input image differs from the output image; wherein a distance between output image representations of a pair of adjacent input pixels is responsive to an importance of at least one of pair of adjacent input pixels.

6. A method for providing an output image, the method comprising: determining an importance value for each input pixels out of multiple input pixels of an input image; applying on each of the multiple input pixels a conversion process that is responsive to the importance value of the input pixel to provide multiple output pixels that form the output image; wherein the input image differs from the output image; wherein the applying is responsive to at least one of the following constraints:
    each input pixel is mapped to an output pixel that is located at substantially a fixed distance from its left and right neighbors;
    each input pixel is mapped to an output pixel located to substantially a similar location to which upper and lower input pixels are mapped;
    an input pixel is mapped to an output pixel located substantially at a same location as an output pixel to which the same input pixel at a previous image was mapped; and
    size and shape of the output image.

7. A method for providing an output image, the method comprising: determining an importance value for each input pixels out of multiple input pixels of an input image; applying on each of the multiple input pixels a conversion process that is responsive to the importance value of the input pixel to provide multiple output pixels that form the output image; wherein the input image differs from the output image; wherein the determining is responsive to a saliency score of the input pixels; wherein the saliency score is computed by applying a wavelet decomposition process.

8. A method for providing an output image, the method comprising: determining an importance value for each input pixels out of multiple input pixels of an input image; applying on each of the multiple input pixels a conversion process that is responsive to the importance value of the input pixel to provide multiple output pixels that form the output image; wherein the input image differs from the output image; wherein the determining is responsive to a saliency score of the input pixels; wherein the saliency score is computed by locating the coarsest diagonal high frequency frame in which the percentage of wavelet coefficients having values below a first threshold is below a second threshold.

9. A method for providing an output image, the method comprising: determining an importance value for each input pixels out of multiple input pixels of an input image; applying on each of the multiple input pixels a conversion process that is responsive to the importance value of the input pixel to provide multiple output pixels that form the output image;

wherein the input image differs from the output image; wherein the determining is responsive to a saliency score of the input pixels;

wherein the saliency score is computed by applying a wavelet decomposition process;

wherein the wavelet decomposition process is followed by thresholding a diagonal high frequency image to generate a binary frame;

re-scaling the binary frame; and smoothing the re-scaled binary frame.

10. A method for providing an output image, the method comprising: determining an importance value for each input pixels out of multiple input pixels of an input image; applying on each of the multiple input pixels a conversion process that is responsive to the importance value of the input pixel to provide multiple output pixels that form the output image; wherein the input image differs from the output image; wherein the applying is preceded by applying a data reduction stage; and applying on each of the results of the data reduction stage a conversion process that is responsive to the importance value of the results to provide converted results.

11. A method for providing an output image, the method comprising: determining an importance value for each input pixels out of multiple input pixels of an input image; applying on each of the multiple input pixels a conversion process that is responsive to the importance value of the input pixel to provide multiple output pixels that form the output image; wherein the input image differs from the output image;

determining an importance value for each input pixels out of multiple input pixels of a group of input images; and applying on each of the multiple input pixels a conversion process that is responsive to the importance value of the input pixel to provide multiple output pixels that form group of output images; wherein inputs image differs from output images.

12. A device for providing an output image, the device comprising: a memory unit adapted to store an input image and a processor, adapted to: determine an importance value for each input pixels out of multiple input pixels of an input image and apply on each of the multiple input pixels a conversion process that is responsive to the importance value of the input pixel to provide multiple output pixels that form the output image; wherein the input image differs from the output image; wherein the processor is adapted to determine an importance of an input pixel in response to motion associated with each of the multiple input pixels.

13. The device according to claim 12 wherein the processor is adapted to determine an importance of an input pixel in response to a saliency score of the input pixels.

14. The device according to claim 12 wherein the processor is adapted to determine an importance of an input pixel in response to an inclusion of an input pixel within an input image that represents a face of a person.

15. A device for providing an output image, the device comprising: a memory unit adapted to store an input image and a processor, adapted to: determine an importance value for each input pixels out of multiple input pixels of an input image and apply on each of the multiple input pixels a conversion process that is responsive to the importance value of the input pixel to provide multiple output pixels that form the output image; wherein the input image differs from the output image; wherein the processor is adapted to apply a conversion process in response to at least one of the following constraints:

each input pixel is mapped to an output pixel that is located at substantially a fixed distance from its left and right neighbors;

each input pixel is mapped to an output pixel located to substantially a similar location to which upper and lower input pixels are mapped;

an input pixel is mapped to an output pixel located substantially at a same location as an output pixel to which the same input pixel at a previous image was mapped; and size and shape of the output image.

\* \* \* \* \*